United States Patent
Kossel et al.

(10) Patent No.: US 9,020,021 B2
(45) Date of Patent: Apr. 28, 2015

(54) PRECODING LOSS REDUCTION

(71) Applicant: International Business Machines Corporation, Armonk, NY (US)

(72) Inventors: Marcel A. Kossel, Rueschlikon (CH); Daihyun Lim, Hopewell Junction, NY (US); Pradeep Thiagarajan, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/953,298

(22) Filed: Jul. 29, 2013

(65) Prior Publication Data

US 2015/0030062 A1    Jan. 29, 2015

(51) Int. Cl.
| | |
|---|---|
| *H04L 25/03* | (2006.01) |
| *H04L 12/26* | (2006.01) |
| *H04B 1/62* | (2006.01) |
| *H04L 25/497* | (2006.01) |
| *H04L 1/24* | (2006.01) |
| *H04L 27/01* | (2006.01) |
| *H04J 11/00* | (2006.01) |

(52) U.S. Cl.
CPC .......... *H04L 25/03343* (2013.01); *H04L 27/01* (2013.01); *H04L 2025/03808* (2013.01); *H04L 25/4975* (2013.01); *H04J 11/0033* (2013.01)

(58) Field of Classification Search
CPC .............. H04L 25/03343; H04L 25/4975; H04L 1/0041; H04L 1/0043; H04B 15/00; G11B 20/10046; H04J 11/0033
USPC ......... 375/232, 230, 229, 296, 295, 285, 259; 398/193, 192, 182; 455/63.1, 39
See application file for complete search history.

(56) References Cited

U.S. PATENT DOCUMENTS

| | | | | |
|---|---|---|---|---|
| 3,699,321 | A | * | 10/1972 | Gibson .................... 708/323 |
| 6,928,107 | B1 | * | 8/2005 | Olafsson et al. ........... 375/219 |
| 8,335,438 | B2 | | 12/2012 | Kim et al. |
| 2004/0137851 | A1 | | 7/2004 | Akhter et al. |

(Continued)

FOREIGN PATENT DOCUMENTS

EP    1157462 A1    4/2004

OTHER PUBLICATIONS

Robert F. H. Fischer, "Precoding and Signal Shaping for Digital Transmission". John Wiley & Sons, Inc., New York, 2002, p. 139.

*Primary Examiner* — Chieh M Fan
*Assistant Examiner* — Michelle M Koeth
(74) *Attorney, Agent, or Firm* — Cantor Colburn LLP; Daniel Morris

(57) ABSTRACT

An apparatus for encoding data signals includes a transmitter configured to encode and transmit a data signal over a communication channel, the transmitter including a precoder; a signal shaper configured to adjust the data signal by applying an equalization setting to the data signal, the equalization setting including an amplitude and offset and transmit the adjusted data signal to the precoder; and a processing unit. The processing unit is configured to perform: receiving channel coefficients associated with the communication channel; for each of a plurality of amplitude settings and a plurality of offset settings, calculating whether a modulo amplitude level would occur at a receiver using a modulo operation; selecting the equalization setting from the plurality of amplitude settings and the plurality of offset settings based on the calculation; and transmitting a control signal specifying the equalization setting to the signal shaper.

19 Claims, 8 Drawing Sheets

(56) References Cited

U.S. PATENT DOCUMENTS

| | | | |
|---|---|---|---|
| 2007/0211641 A1* | 9/2007 | Fu et al. | 370/241 |
| 2010/0226422 A1* | 9/2010 | Taubin et al. | 375/231 |
| 2012/0201287 A1* | 8/2012 | Kobayashi | 375/232 |
| 2012/0307706 A1* | 12/2012 | Nakano et al. | 370/312 |

* cited by examiner

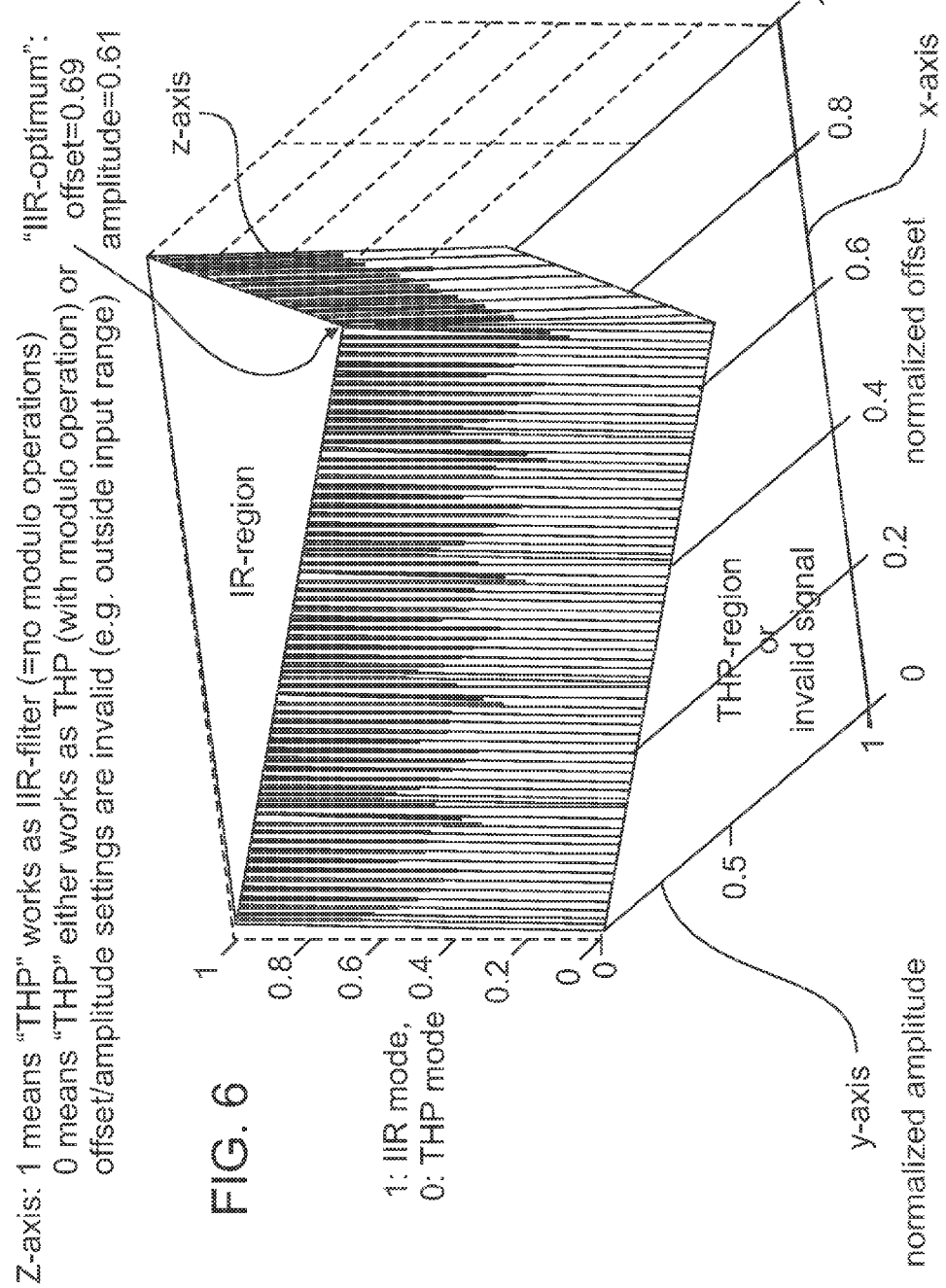

PRECODING LOSS REDUCTION

BACKGROUND

The signal integrity (SI) of data transmission over wireline channels is affected by intersymbol interference (ISI) arising from channel loss and reflections arising from impedance mismatches. ISI induced eye closure can be mitigated by feed forward equalization (FFE) or continuous time linear equalization (CTLE), which are both based on finite impulse response (FIR) filtering. SI degradation owing to reflections can be addressed by a decision feedback equalizer (DFE). In some applications such as digital subscriber line (DSL) communication and memory links, only the transmit side is accessible for the implementation of channel equalization. An infinite impulse response (IIR) based equalizer with similar performance as a DFE but applied to the transmit side is called a Tomlinson-Harashima precoding (THP) equalizer.

SUMMARY

Exemplary embodiments include an apparatus for encoding data signals. The apparatus includes a transmitter configured to encode and transmit a data signal over a communication channel, the transmitter including a precoder; a signal shaper configured to adjust the data signal by applying an equalization setting to the data signal, the equalization setting including an amplitude and offset and transmit the adjusted data signal to the precoder; and a processing unit. The processing unit is configured to perform: receiving channel coefficients associated with the communication channel; for each of a plurality of amplitude settings and a plurality of offset settings, calculating whether a modulo amplitude level would occur at a receiver using a modulo operation; selecting the equalization setting from the plurality of amplitude settings and the plurality of offset settings based on the calculation; and transmitting a control signal specifying the equalization setting to the signal shaper.

Other exemplary embodiments include a method of encoding data signals. The method includes: receiving a data signal and channel coefficients at a transmitter configured to encode and transmit the data signal over a communication channel, the transmitter including a precoder; for each of a plurality of amplitude settings and a plurality of offset settings, calculating whether a modulo amplitude level would occur at a receiver based on the channel coefficients and a test signal, and using a modulo operation; selecting an equalization setting including an amplitude and offset from the plurality of amplitude settings and the plurality of offset settings based on the calculation; adjusting the data signal by applying the selected equalization setting to the data signal; and filtering the adjusted signal by the precoder to generate a filtered signal, and transmitting the filtered signal to a receiver over the communication channel.

Further exemplary embodiments include a computer program product for encoding data signals. The computer program product includes a tangible storage medium readable by a processing circuit and storing instructions for execution by the processing circuit for performing a method including: receiving a data signal and channel coefficients at a transmitter configured to encode and transmit the data signal over a communication channel, the transmitter including a precoder; for each of a plurality of amplitude settings and a plurality of offset settings, calculating whether a modulo amplitude level would occur at a receiver based on the channel coefficients and a test signal, and using a modulo operation; selecting an equalization setting including an amplitude and offset from the plurality of amplitude settings and the plurality of offset settings based on the calculation; adjusting the data signal by applying the selected equalization setting to the data signal; and filtering the adjusted signal by the precoder to generate a filtered signal, and transmitting the filtered signal to a receiver over the communication channel.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 6 is a plot of signal amplitude and offset ranges generated by the method of FIG. 4.

DETAILED DESCRIPTION

Embodiments described herein include systems and methods for precoding transmission signals to prevent the transmission of modulo amplitude levels over a transmission channel, e.g., when applying THP equalization. In one embodiment, a scanner is in operable communication with a signal precoder, e.g., in a signal transmitter. The scanner is configured to determine scale amplitude and offset value combinations to be applied to a transmitted signal that prevent modulo amplitude levels from being received by a receiver. An embodiment of a method prevents such modulo amplitude levels in receiver eye diagrams so that transmitter precoding becomes compliant with, e.g., existing DRAM receivers in DDR memory links. It is noted that the term "transmitter precoding" refers to the precoding using mathematical operations (e.g., to maximize signal power at the receiver, as opposed to a dedicated line code such as 8b/10b encoding.

In one embodiment, appropriate offset and launch levels are determined by a modulo scanner that runs offline with a test pattern and sweeps the offset and launch levels. Appropriate or optimum offset and amplitude levels may be inputted to a signal shape for filtering via an equalizer.

Figure 1:
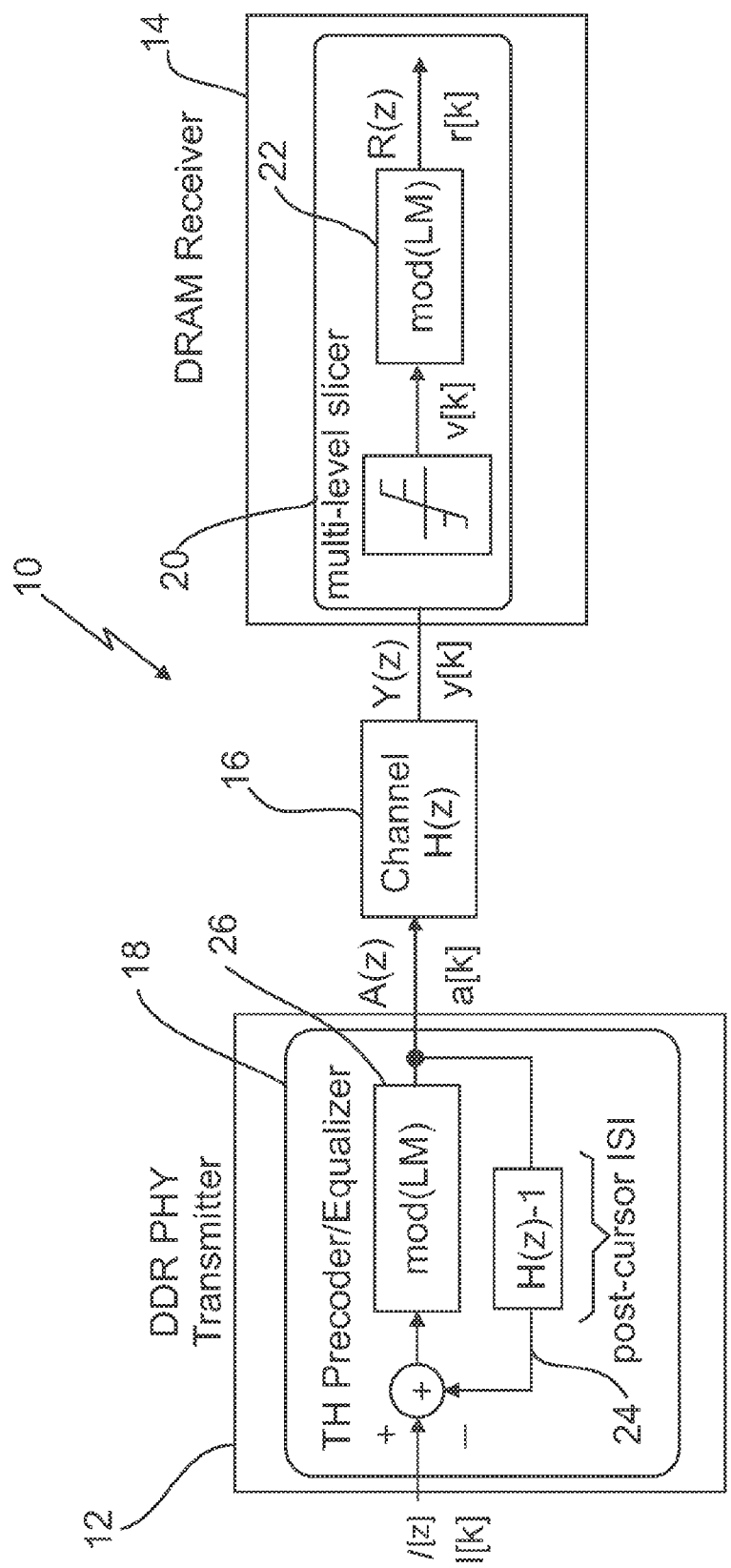
FIG. 1 illustrates a block diagram of an example of a communication channel transmission arrangement.

FIG. 1 illustrates an example of a memory link arrangement 10 that includes a transmitter 12 configured to encode and transmit a communication signal to a receiver 14 over a channel 16. The transmitter 12 includes a precoder 18 that has components configured to equalize an output signal so as to reduce or cancel intersymbol interference (ISI) and reflections. The receiver 14 includes components to receive and decode the signal. In this example, such components include a multi-level slicer 20 including a modulo (MOD) operator 22.

In one embodiment, the precoder 18 is a Tomlinson-Harashima (TH) precoder. Tomlinson-Harashima precoding (THP) is a transmitter equalization technique in which the post-cursor intersymbol interference (ISI) is cancelled by means of an infinite-impulse response (IIR) filter with modulo-based amplitude limitation. Its working principle is very similar to a decision feedback equalizer (DFE) but in contrast to a DFE it does not suffer from error propagation since the data sequence to be transmitted is known a priori in the transmitter. Compared to linear equalizers such as feedforward equalizers (FFE) based on finite-impulse response (FIR) filtering, nonlinear IIR filter based equalizers are capable of eliminating ISI much more efficient for a given number of taps. Transmitter precoding is also favorable in links where the transmitters and receivers are provided by different vendors. Typical examples include xDSL modems and Gigabit Ethernet.

For example, the precoder 18 includes an IIR filter 24 for subtracting the ISI. A modulo (MOD) operator 26 is included in the precoder 18 to limit the signal amplitude.

In one embodiment, the memory link arrangement 10 is an asymmetric transmission arrangement in which the transmission rate or speed in the forward channel is different than the rate or speed in the reverse channel. For example, as shown in FIG. 1, the transmitter 12 is a DDR memory link transmitter where the memory controller unit (MCU) in the transmitter 12 is implemented in a fast process and includes the link's equalization capability, whereas the receiver 14 includes a relatively simple and relatively slow DRAM implementation.

One challenge in implementing THP in such memory links—despite the outstanding equalization and power performance—is the fact that conventional THP eliminates the post-cursor ISI while introducing additional amplitude levels in the receive side eye diagrams due to the nonlinear modulo operation at the post-cursor intersymbol-interference (ISI) subtraction in the THP's inverse channel filter. These additional amplitude levels, which are amplitudes exceeding the channel's limit, are referred to herein as "modulo amplitude levels" or "modulo levels." As a consequence, the demodulation of THP signals typically requires multi-level slicers (e.g., the multi-level slicer 20 shown in FIG. 1).

For example, as discussed above, a THP equalizer includes an IIR based equalizer applied to the transmit side and used to remove ISI and reflections. Owing to the modulo (MOD) arithmetic applied to stabilize the IIR filter, additional modulo amplitude levels in the receiver (Rx) eye diagrams may occur, which limit the backwards compatibility to conventional NRZ receivers typically used in I/O links that do not use THP equalization.

A description of a THP process using a full-rate TH equalizer is described below in conjunction with the arrangement 10 in FIG. 1, to cancel post-cursor ISI in the transmitter 12 and thereby reduce the complexity of the receiver analog front-end. To avoid instability of the inverse filter, a MOD adder is used instead of a conventional adder. Apart from the MOD adder, the inverse filter in the TH equalizer is closely related to that of a DFE but has the advantage that it does not suffer from error propagation because it is located in the transmitter, where the transmitted data are known a priori.

A transmitter output signal a[k] is generated from an input signal I[k] that is fed to the precoder including the IIR filter 24 with modulo based amplitude limitation. The precoder output a[k] can be written as:

$$a[k] = I[k] - \sum_{j=1}^{L} h[j]a[k-j] + 2Mb[k] \quad (1)$$

where I[k] is a data symbol, $\sum_{j=1}^{L} h[j]a[k-j]$ is the post-cursor ISI (convolution of the data pattern history with the channel's pulse response), and h[j] are post-cursor tap weights. The term 2 Mb [k] is the modulo (MOD) operator term that keeps the transmitted signal a[k] within a valid amplitude range. The MOD operator includes of a factor 2M, which describes the transmitter's launch level with M being the number of data symbols, and 2 being the symbol spacing (which can be generalized as any number N) and a factor b [k] that is an appropriate integer to fold back the ISI subtraction to the valid range.

Note that in the digital domain the MOD operator is not a dedicated component; it is implemented implicitly by the truncation of the vector that represents a [k]. The high-level schematic of the THP transmitter 12 shown in FIG. 1 can be obtained when applying the z transform to eq. (1) to get:

$$A(z) = I(z) - [H(z) - 1]A(z) + 2\,MB(z), \quad (2)$$

which can be solved for the transmit signal A(z) in the z-domain $$A(z) = \frac{I(z) + 2MB(z)}{H(z)}. \quad (3)$$

Because the convolution between the transmit signal and the channel's pulse response in the time domain transforms to a multiplication in the frequency domain (z-domain), it can be shown that the received signal in the z-domain becomes:

$$R(z) = H(z)A(z) = I(z) + 2\,MB(z), \quad (4)$$

which means that the original symbol I(z) is received again but with a MOD jump (=2 MB(z)) if B(z) is unequal to zero.

Modulo levels at the receiver 14 occur when the MOD arithmetic detects, for an input signal I[k], an over-voltage in the transmitter's IIR filter that subtracts the channel's ISI and reflections. The MOD arithmetic applies a MOD step to bring that signal back to the transmitter's valid output swing range. The following example illustrates this condition.

In this example, the transmitter output swing ranges from 0V to 1V and the modulation scheme is 4-PAM (pulse amplitude modulation) with the following symbol mapping: b00: 0.125V, b10: 0.375V, b01: 0.625V, and b11: 0.875V. If the symbol b10 (=0.375V) is to be transmitted and the post-cursor ISI, which is subtracted by the IIR filter is 0.56V, the resulting transmit signal would be 0.375V-0.56V=-0.185V, which is outside the valid transmit range. As a consequence, the MOD arithmetic applies a MOD-step (i.e., -0.185V+ 1.0V=0.815V) to bring the transmit signal back to the valid transmit range. When data is being transmitted over a channel, this is described mathematically by the convolution of the transmitted data pattern with the channel's pulse response. Because the MOD arithmetic is a nonlinear operation and the convolution is linear, the resulting received signal contains again the nonlinearity, which manifests as a modulo amplitude level in the receiver eye diagram. In this example, a MOD level of 1.375V×α would occur where α is the channel attenuation, which can be demodulated by another MOD operation in the demodulator of the receiver (i.e., 1.375V×α- 1V×a). However, because the signal gets attenuated by the channel loss (a), the received signal is much less amplitude constrained (as opposed to the transmit side) and additional MOD levels can still be demodulated if a multilevel slicer is available (each level either belongs to a symbol level or a MOD amplitude level).

FIG. 2 illustrates why the THP receiver 12 of FIG. 1 includes a multi-level slicer followed by a MOD operator.

Figure 2A:
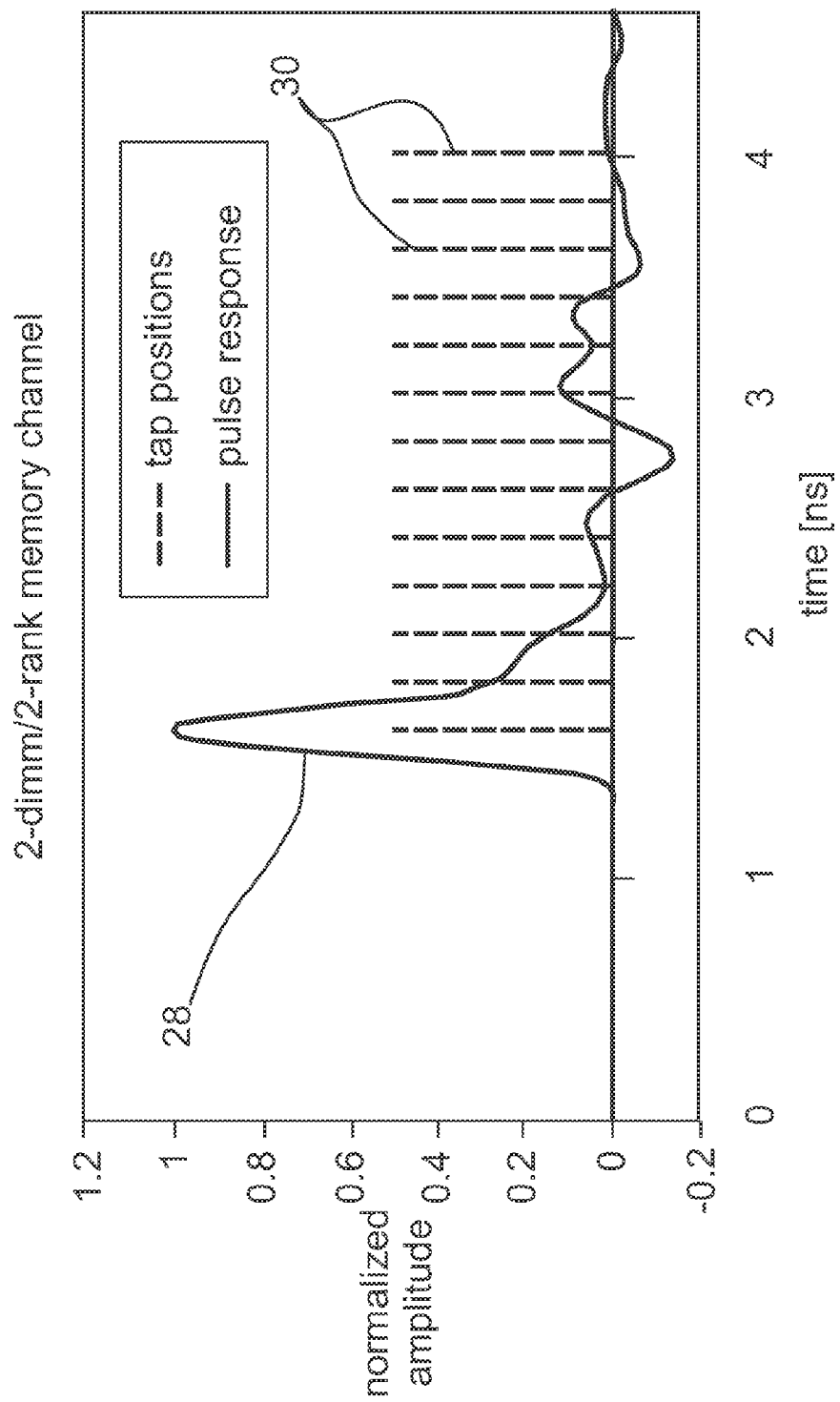
FIG. 2A-FIG. 2C, collectively referred to as FIG. 2, illustrates the pulse response of an exemplary memory channel and receiver eye diagrams corresponding to a signal generated via a THP precoder.

FIG. 2A shows the pulse response 28 of the receiver 14 to a received 5 Gb/s THP-equalized a non-return-to-zero (NRZ) signal transmitted over a 2-rank 2-dimm memory channel. A number of taps 30 are shown, each with a corresponding tap weight h[j].

Figure 2B:
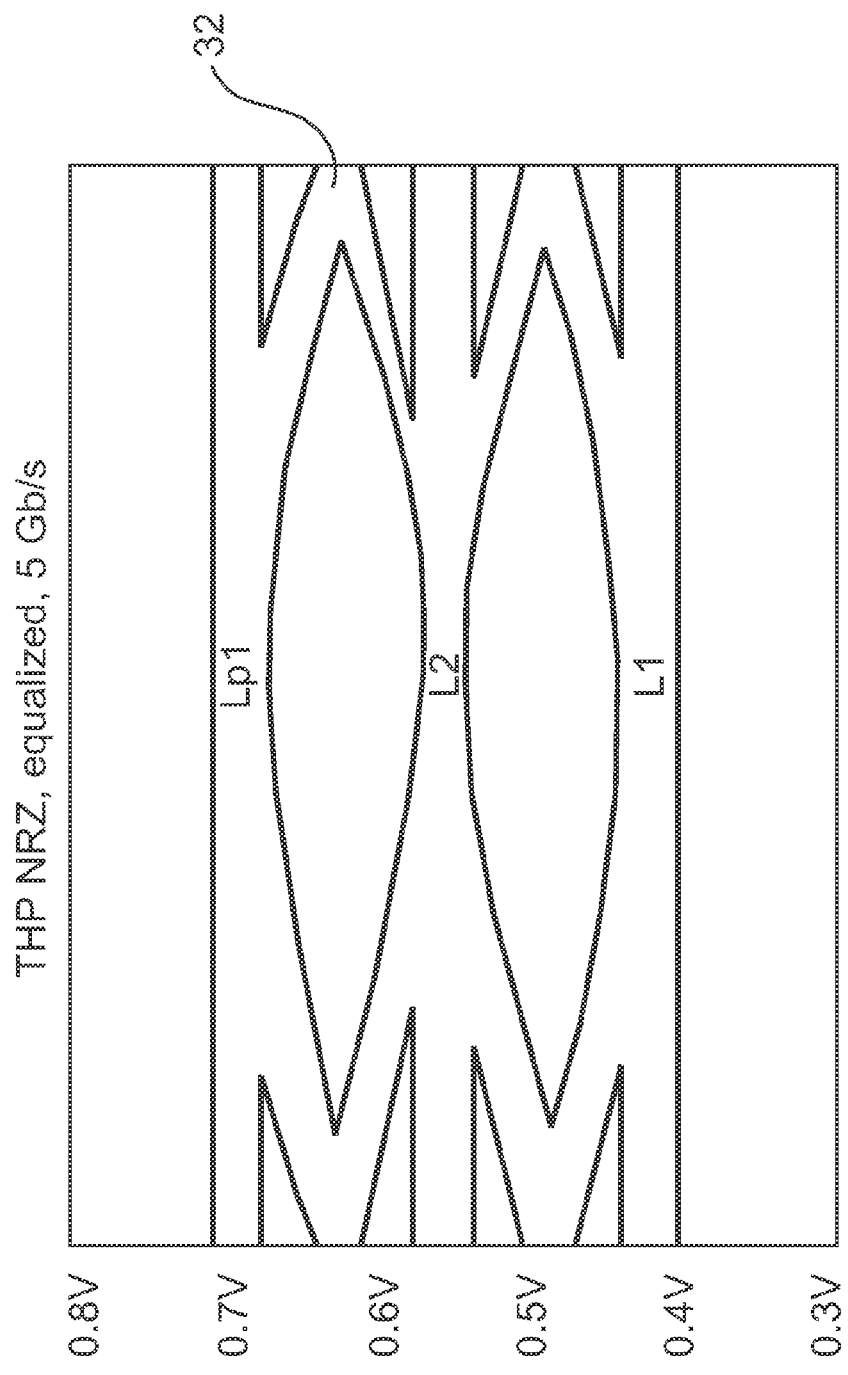
Figure 2C:
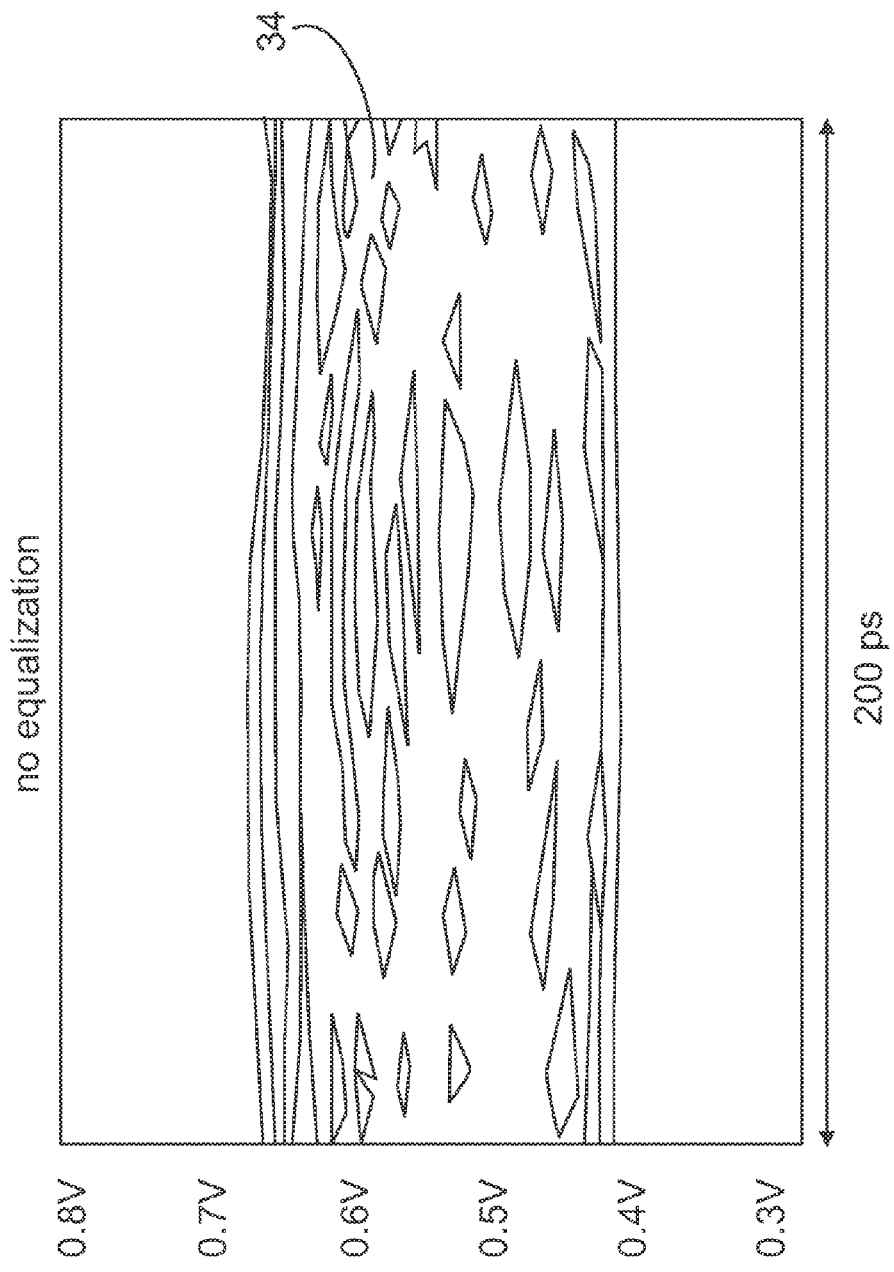

FIG. 2B shows a receiver eye diagram 32 for a signal equalized by the precoder 18, and FIG. 2C shows an eye diagram 34 for the un-equalized signal. When comparing the signal amplitudes of the equalized and non-equalized eye diagrams, it becomes clear that the "regular" NRZ eye diagram is defined by the amplitude levels L1 and L2 whereas Lp1 is an additional modulo amplitude level that needs to be mapped to the NRZ level L 1. In the embodiment shown in FIG. 1, detection of Lp1 and folding back to L1 is performed by the multilevel slicer 20 with the successive MOD operator 22.

Figure 3:
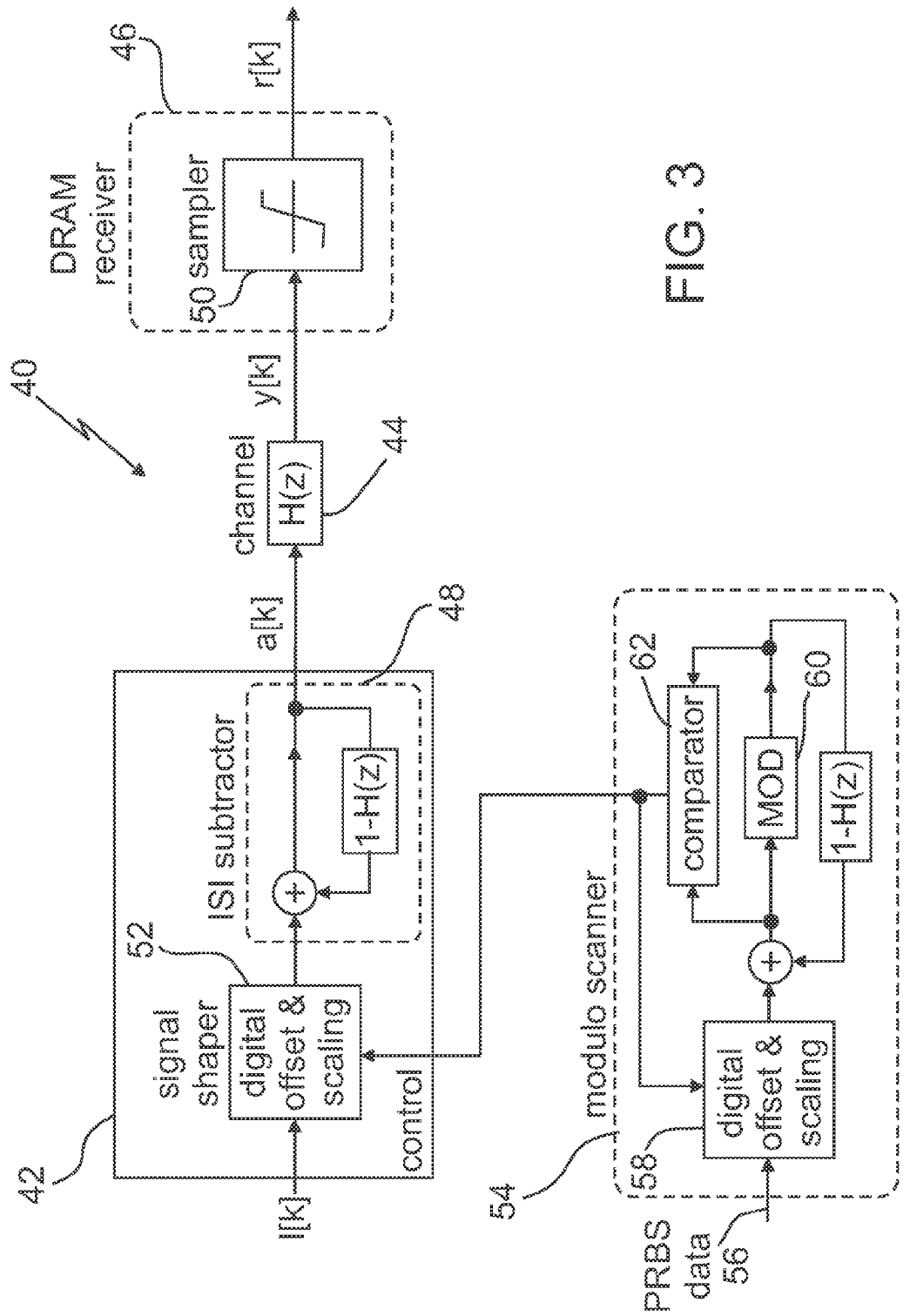
FIG. 3 illustrates a block diagram of an embodiment of a communication channel transmission arrangement.

FIG. 3 illustrates an embodiment of a transmission arrangement 40 that prevents such additional modulo amplitude levels from occurring at the receiver input. The arrangement 40 includes a transmitter 42 configured to transmit a communication signal to a receiver 44 over a channel 46. As compared to the transmitter 12, the transmitter 42 includes a relatively simple precoder 48 that includes an IIR filter or other appropriate filter for subtracting ISI, without requiring a MOD operator. Also, as compared to the receiver 14, the receiver 44 does not require a multi-level slicer and MOD operator, but instead includes a single level slicer 50 to demodulate the signal.

This embodiment may be effective for receivers that do not provide multilevel slicing, and thus do not allow MOD levels. This embodiment can be provided to condition the transmit signal such that the THP equalizer only works in the IIR mode without generating any MOD jumps. Because of the above described relationship between MOD jumps in the transmitter and resulting MOD amplitude levels at the receiver, this embodiment can detect and prevent the activation of the MOD arithmetic already at the transmitter.

In this embodiment, the arrangement 40 includes a signal shaper 52 that receives the input signal I[k] and adjusts the offset and scaling of the input signal before the input signal is received in the precoder. In one embodiment, the signal shaper applies an equalization setting to the input signal by applying an amplitude scale and an offset to the input signal. The applied amplitude scale and offset are selected such that no modulo amplitude level can occur in the receiver eye diagram.

In one embodiment, the equalization setting, i.e., the applied amplitude scale and offset, is calculated by a processing unit such as a modulo scanner 54. The modulo scanner 54 is configured to receive a test signal 56 and apply a plurality of amplitude and offsets, e.g., all possible amplitude and offset pairs, to the test signal 56. For each possible pair, the modulo scanner determines or calculates whether transmitting the data signal using that pair would result in a modulo amplitude level occurring in the receiver 44.

In one embodiment, the modulo scanner 54 includes an offset and scaling unit 58 that applies the amplitude and offset pairs and inputs the test signal to a MOD operator 60. A comparator 62 is configured to compare the input signal to the signal outputted by the MOD operator 60, i.e., an output signal. The scanner 54 may store the results of the comparison for each amplitude and offset pair, e.g., in the offset and scaling unit 58. The equalization setting may be selected from the results by selecting an amplitude and associated offset that would not result in a modulo amplitude level. For example, the amplitude and associated offset is selected from a pair for which the input signal and the output signal from the MOD operator are equal.

Figure 4:
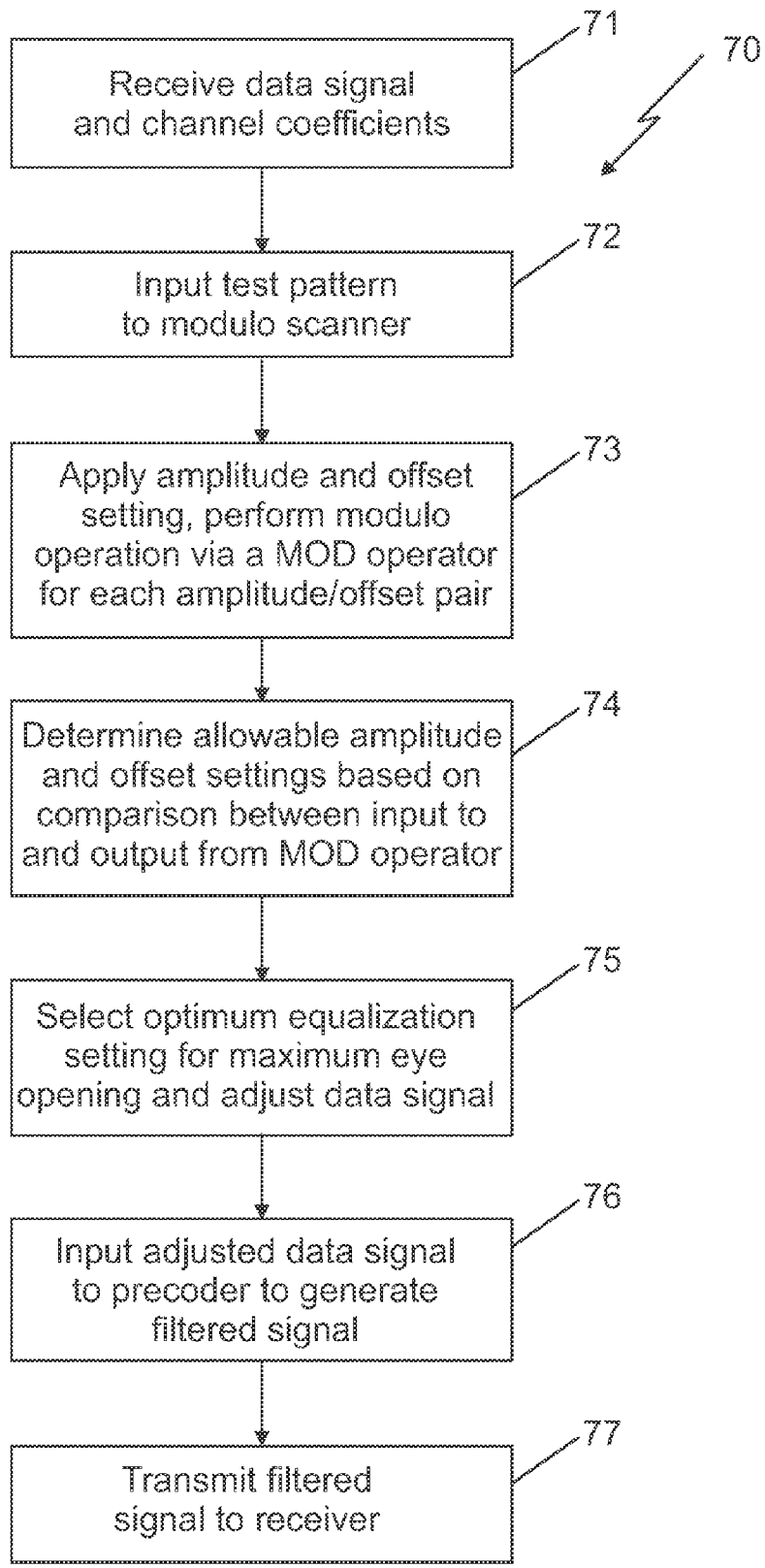
FIG. 4 is a flowchart illustrating a method of encoding and transmitting data or a communication signal over a communication channel.

Referring to FIG. 4, an embodiment of a method 70 of encoding and transmitting data or a communication signal over a communication channel is described. The method 70 includes one or more stages 71-77. In one embodiment, the method includes the execution of all of the stages 71-77 in the order described. However, certain stages may be omitted, stages may be added, or the order of the stages changed. The method 70 may be performed using components of the arrangement 40, but is not so limited, and can be used in conjunction with any suitable processing and transmission device or system and any suitable hardware and/or software configuration.

In the first stage 71, the transmitter 42 receives an input signal I[k] such as a data stream, symbol stream or bit stream. Channel coefficients for each channel are input to the feedback path in the ISI subtractor, e.g., the precoder 48, which is configured to subtract the post-cursor ISI from the input symbol I[k]. The channel coefficients are also input to a processing unit for calculation of the equalization setting, e.g., the modulo scanner 54.

In the second stage 72, a test signal or pattern is input to the modulo scanner 54. An exemplary test pattern is a pseudo-random bit sequence (PRBS). The modulo scanner may be implemented as part of the transmitter and/or precoder (e.g., on-chip) or implemented externally.

In the third stage 73, the modulo scanner 54 uses a processing unit such as a circuit or state machine to sweep the offset and amplitude scaling factor, inputting potential offset and scaling factor pairs to the MOD operator 60. The MOD operator 60 performs the modulo operation for each pair.

In one embodiment, the processing unit is the offset and scaling unit 52, which applies multiple amplitude settings (e.g., amplitude scaling factors) and offset settings to the test signal. The scanner 54 applies the MOD operator 60 to the test signal for each applied amplitude and offset pair. The result of the modulo operation is provided as an output signal.

In the fourth stage 74, the scanner 54 determines based on the modulo operation whether a modulo level would occur at a receiver for each amplitude/offset pair. Based on this determination, the scanner 54 selects one or more equalization settings to be used to adjust the input signal I[k] before inputting the signal to the precoder 48.

In one embodiment, the MOD input and output for each amplitude/offset pair are compared to determine whether the input and output are equal. For example, offset and scaling unit 58 uses a comparator 62 to compare the MOD input and output signals for each pair. If the input and output signals are equal, a data signal adjusted using the associated settings would not result in a modulo amplitude level and can be used by the signal shaper 52. If the input and output signals are unequal, a modulo amplitude would occur and the unit 58 proceeds to the next offset and amplitude scaling setting pair.

In one embodiment, the results of the comparison are stored so that an equalization setting can be selected from allowable amplitude/offset pair. Pairs that result in unequal signals may be assigned a first value (e.g., zero). Pairs that result in equal signals (i.e., allowable pairs) may be assigned a second value (e.g., one). In one embodiment, the results are stored so that a preferred or optimum pair can be selected from the allowable pairs.

In the fifth stage 75, the modulo scanner 54 selects an equalization setting including an allowable amplitude/offset pair, and sends a control signal to the signal shaper 52. The signal shaper adjusts the offset and scales the data signal I[k]

based on the allowable offset/amplitude values and/or ranges indicated by the control signal. The input data signal I[k] is thus offset and scaled such that no modulo levels will occur at the receiver input when the filtered signal a[k] is transmitted. In one embodiment, the amplitude/offset pair resulting in the largest eye opening, i.e., the optimum pair, is selected. An example of the determination of the optimum pair is illustrated in FIG. 6.

.In the sixth stage 76, the signal shaper 52 inputs the scaled and offset signal I[k] to an ISI subtractor, e.g., the precoder 48. The precoder 48 filters the signal and transmits the filtered signal a[k] to the receiver. In the example shown in FIG. 3, the precoder 48 operates as an IIR filter without a MOD operator.

In the seventh stage 47, the receiver 44 receives the transmitted signal y[k] and demodulates the signal via, e.g., the single level slicer 50.

In one embodiment, after the scanner records the MOD inputs and outputs of all of the settings, the largest scaling factor of the recorded values that does not produce modulo amplitude levels is fed to the signal shaper together with the associated offset value. This pair of values then corresponds to the equalization setting that results in the largest eye opening at the receiver input without producing additional modulo amplitude levels, thus allowing ordinary NRZ slicers to be used in the receiver front end. The largest scaling factor automatically corresponds to the smallest precoder loss for a given channel. The term "precoding loss" refers to the original THP scaling, which assures equal spacing between regular symbol levels and MOD amplitude levels. For example, for 2-PAM or NRZ signaling, a logical 0 (i.e., b0) and 1 is mapped as follows if the valid transmit range is 0V to 1V: b0→0.25V and b1→0.75V. The symbol spacing is 0.5V (=0.75V-0.25V) and the MOD amplitude levels are at 1.25V, 1.75V, 2.25V, etc. and −0.25V, −0.75V, −1.25V, etc, respectively. Note that this scaling by a factor of 0.5 (corresponding to precoding loss) is required to make sure that the same spacing is obtained by the closest MOD level and the largest or smallest regular symbol level (e.g., 1.25V-0.75V=0.5V and 0.25−(−0.25V)=0.5V). Compared to 2-PAM signaling without THP precoding, that allows for directly transmitting 1V (=logical 1) and 0V (=logical 0). In this example, a factor of 0.5 is lost, which is called precoding loss. The higher the PAM-order (e.g., 4-PAM), the smaller the precoding loss becomes but the higher the likelihood of receiving MOD amplitude levels.

Figure 5:
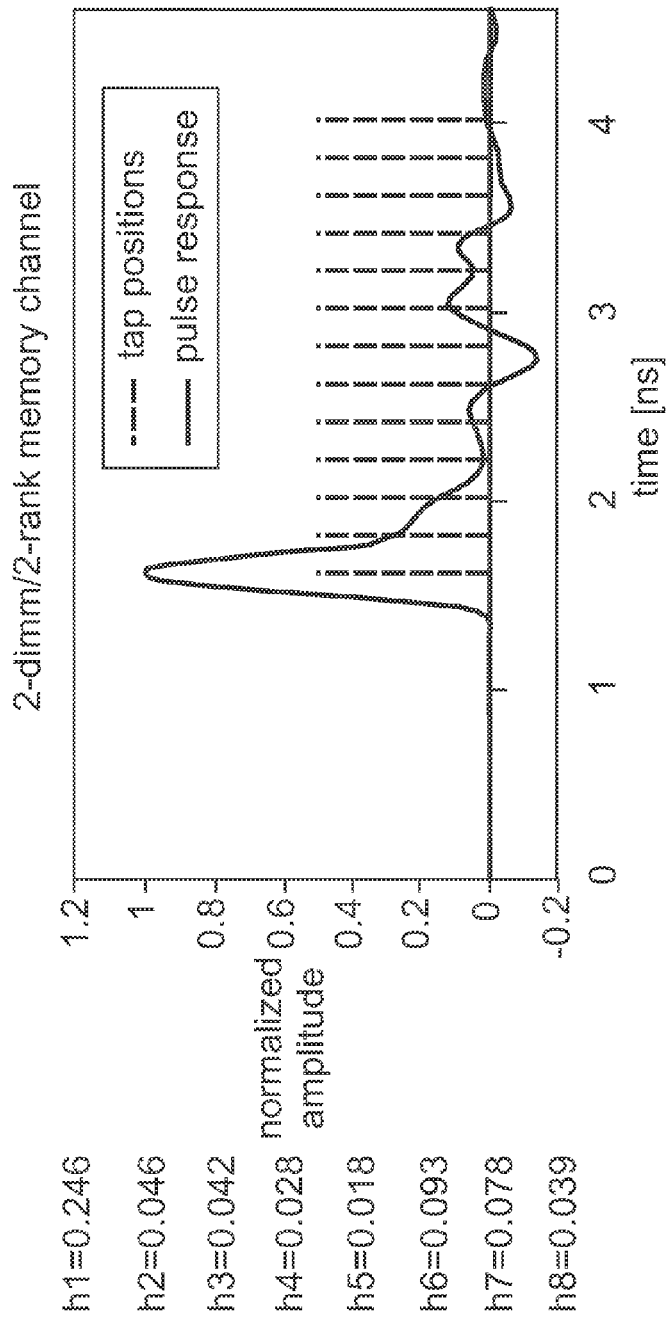
FIG. 5 illustrates the pulse response and tap weights for an exemplary memory channel.

FIGS. 5 and 6 illustrate an example of the operation of the modulo scanner. FIG. 5 shows the pulse response and tap weights h1-h8 for a 2-dimm 2-rank memory channel. FIG. 6 is a 3-dimensional plot of the signal amplitude and offset ranges analyzed by the scanner.

In FIG. 6, the vertical axis (z-axis) represents a value of one or zero, representing a logical one or zero calculated by the scanner. The horizontal axes show the amplitude scale of the signal (axis "y") and the offset of the signal (axis "x"). An output (e.g., from the comparator 62) of logical 1 (e.g., 0.995 V) indicates that the input and output of the MOD operator are equal, and an output of logical zero (e.g., 0.385 V) indicates that the input and output are not equal and the signal would result in additional modulo level(s).

The plot shows the range of signal amplitudes scale and offsets (shown as the IIR-region) for which input signals do not produce modulo levels. A signal input to the precoder with such settings can be modulated via the precoder shown in FIG. 3 (e.g., with an IIR filter) without a MOD operator and can be demodulated without a multi-level slicer and MOD operator in the receiver. This graph shows that the optimum settings for the input signal are an offset of 0.69 and an amplitude scale of 0.61, which represent the greatest allowable amplitude scaling factor and associated offset.

On the other hand, input signal ranges in the plot region designated as "THP-region or invalid signal" show settings for which signals input to the precoder would require modulo operations or for which the settings are invalid (e.g., outside the input range).

In this example, using the post-cursor tap weights of FIG. 5, a sweep of the amplitude and offset was performed, the results of which are shown in the 3-D plot of FIG. 6. As indicated in the plot, the optimum setting is obtained for a peak-to-peak amplitude of 0.61 and an offset of 0.69 if the output DAC range of the transmitter goes from 0 to +1 and the main tap of the channel's pulse response is normalized to 1. The optimum settings are then passed over to the THP equalizer, which effectively operates as an optimized IIR equalizer as no modulo amplitude levels are produced. Note that in particular the offset parameter is dependent on the definition of the valid transmit range. In this example, an unsigned transmit range of 0 to 1 is assumed. If a signed transmit range of −0.5 to 0.5 is assumed, the offset-parameter would change correspondingly. The difference between the unsigned and signed transmit range is visible only if MOD levels are allowed (i.e., without the confinement to a pure IIR mode as described herein). An unsigned transmit range would result in asymmetric MOD eye diagrams (e.g., see eye diagram 32 in FIG. 2 in which there is only one additional MOD eye diagram (L2-Lp1) above the regular eye diagram (L1-L2) but there is no corresponding lower MOD eye diagram). The unsigned transmit range has the advantage that it allows to reduce the bit width of the internal calculations in the THP's IIR filter (see, e.g., feedback loop 24 in FIG. 1). On the other hand, a signed transmit range results in symmetrical MOD eye diagrams and slightly reduces the likelihood of generating MOD amplitudes but has the disadvantage of requiring a more complex signed format for the internal THP calculations.

The embodiments described herein provide various advantages and technical effects. For example, the embodiments allow for the adjustment and transmission of data signals that do not result in modulo amplitude levels that would need to be processed by a receiver. This feature relieves the receive side from receiving modulo levels that are not compatible with the receiver. Embodiments allow for the use of THP equalization in memory links without requiring the use of multi-level slicers in receivers.

In addition, the procedures described herein to limit a THP equalizer to its IIR mode can result in a better signal-to-noise (SNR) ratio and larger eye opening than prior art techniques by allowing for the reduction of precoding loss, especially for channels with benign characteristics (i.e., small ISI and reflections).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for encoding data signals, comprising:
a transmitter configured to encode and transmit a data signal over a communication channel, the transmitter including a precoder;

a signal shaper configured to adjust the data signal by applying an equalization setting to the data signal, the equalization setting including an amplitude and offset and transmit the adjusted data signal to the precoder; and a processing unit in communication with a memory device, the memory device storing instructions that when executed by the processing unit result in:

receiving a test signal from the transmitter;

receiving channel coefficients associated with the communication channel;

applying a plurality of amplitude settings and a plurality of offset settings to the test signal, and for each of the plurality of amplitude settings and the plurality of offset settings, calculating whether a modulo amplitude level would occur at a receiver using a modulo operation, wherein the calculating includes performing the modulo operation on the test signal and generating an output signal, and comparing the test signal to the output signal;

selecting the equalization setting from the plurality of amplitude settings and the plurality of offset settings based on the calculations; and transmitting a control signal specifying the equalization setting to the signal shaper.

2. The apparatus of claim 1, wherein the equalization setting includes an amplitude setting and an associated offset setting for which the modulo amplitude level would not occur at the receiver.

3. The apparatus of claim 1, wherein the processing unit includes:

an offset and scaling unit configured to apply each possible amplitude and offset setting pair from the plurality of amplitude settings and the plurality of offset settings to the test signal to produce an input signal for each possible pair;

a modulo operator configured to receive the input signal for each possible pair, and generate an output signal for each possible pair by performing the modulo operation on the input signal; and a comparator configured to compare the input signal to the output signal and determine whether each possible pair would result in a modulo amplitude level at the receiver.

4. The apparatus of claim 3, wherein, for each possible pair, the comparator is configured to:

store a first value if the input signal is equal to the output signal, indicating that an associated pair of amplitude and offset settings would not result in the modulo amplitude level; and store a second value if the input signal is not equal to the output signal, indicating that an associated pair of amplitude and offset settings would result in the modulo amplitude level.

5. The apparatus of claim 4, wherein the equalization setting includes a pair of amplitude and offset settings that is associated with the first value.

6. The apparatus of claim 5, wherein the equalization setting includes the pair of amplitude and offset settings associated with the greatest amplitude.

7. The apparatus of claim 1, wherein the test signal is a pseudo-random bit sequence (PRBS).

8. The apparatus of claim 1, wherein the precoder includes an infinite impulse response (IIR) filter.

9. A method of encoding data signals, comprising:

receiving a data signal and channel coefficients at a transmitter configured to encode and transmit the data signal over a communication channel, the transmitter including a precoder;

transmitting a test signal from the transmitter to a modulo scanner;

applying a plurality of amplitude settings and a plurality of offset settings to the test signal, and for each of the plurality of amplitude settings and the plurality of offset settings, calculating whether a modulo amplitude level would occur at a receiver based on the channel coefficients and the test signal, and using a modulo operation, wherein the calculating includes performing the modulo operation on the test signal and generating an output signal, and comparing the test signal to the output signal;

selecting an equalization setting including an amplitude and offset from the plurality of amplitude settings and the plurality of offset settings based on the calculations;

adjusting the data signal by applying the selected equalization setting to the data signal; and filtering the adjusted signal by the precoder to generate a filtered signal, and transmitting the filtered signal to the receiver over the communication channel.

10. The method of claim 9, wherein the equalization setting includes an amplitude setting and an associated offset setting for which the modulo amplitude level would not occur at the receiver.

11. The method of claim 9, wherein the selecting the equalization setting includes:

applying each possible amplitude and offset setting pair from the plurality of amplitude settings and the plurality of offset settings to the test signal to produce an input signal for each possible pair;

performing the modulo operation for each possible pair, and generating an output signal for each possible pair; and comparing the input signal to the output signal and determining whether each possible pair would result in a modulo amplitude level at the receiver.

12. The method of claim 11, wherein the selecting the equalization setting includes:

storing a first value if the input signal is equal to the output signal, indicating that an associated pair of amplitude and offset settings would not result in the modulo amplitude level; and storing a second value if the input signal is not equal to the output signal, indicating that an associated pair of amplitude and offset settings would result in the modulo amplitude level.

13. The method of claim 12, wherein the selecting the equalization setting includes selecting a pair of amplitude and offset settings associated with the first value and transmitting the selected equalization setting to a signal shaper configured to adjust the data signal.

14. The method of claim 13, wherein the equalization setting includes the pair of amplitude and offset settings associated with the greatest amplitude.

15. A computer program product for encoding data signals, the computer program product comprising:

a non-transitory tangible storage medium readable by a processing circuit and storing instructions for execution by the processing circuit for performing a method comprising:

receiving a data signal and channel coefficients at a transmitter configured to encode and transmit the data signal over a communication channel, the transmitter including a precoder;

transmitting test signal from the transmitter to a modulo scanner;

applying a plurality of amplitude settings and a plurality of offset settings to the test signal, and for each of the plurality of amplitude settings and the plurality of offset settings, calculating whether a modulo amplitude level would occur at a receiver based on the channel coefficients and the test signal, and using a modulo operation, wherein the calculating includes performing the modulo operation on the test signal and generating an output signal, and comparing the test signal to the output signal;

selecting an equalization setting including an amplitude and offset from the plurality of amplitude settings and the plurality of offset settings based on the calculations;

adjusting the data signal by applying the selected equalization setting to the data signal; and filtering the adjusted signal by the precoder to generate a filtered signal, and transmitting the filtered signal to the receiver over the communication channel.

16. The computer program product of claim 15, wherein the equalization setting includes an amplitude setting and an associated offset setting for which the modulo amplitude level would not occur at the receiver.

17. The computer program product of claim 15, wherein the selecting the equalization setting includes:

applying each possible amplitude and offset setting pair from the plurality of amplitude settings and the plurality of offset settings to the test signal to produce an input signal for each possible pair;

performing the modulo operation for each possible pair, and generating an output signal for each possible pair; and comparing the input signal to the output signal and determining whether each possible pair would result in a modulo amplitude level at the receiver.

18. The computer program product of claim 17, wherein the selecting the equalization setting includes:

storing a first value if the input signal is equal to the output signal, indicating that an associated pair of amplitude and offset settings would not result in the modulo amplitude level; and storing a second value if the input signal is not equal to the output signal, indicating that an associated pair of amplitude and offset settings would result in the modulo amplitude level.

19. The computer program product of claim 18, wherein the selecting the equalization setting includes selecting a pair of amplitude and offset settings associated with the first value and transmitting the selected equalization setting to a signal shaper configured to adjust the data signal.

* * * * *